United States Patent
Krikorian et al.

(10) Patent No.: US 7,333,049 B2
(45) Date of Patent: Feb. 19, 2008

(54) WAVEFORM AMBIGUITY OPTIMIZATION FOR BISTATIC RADAR OPERATION

(75) Inventors: Kapriel V. Krikorian, Calabasas, CA (US); Robert A. Rosen, Agoura Hills, CA (US)

(73) Assignee: Raytheon Company, Waltham, MA (US)

( * ) Notice: Subject to any disclaimer, the term of this patent is extended or adjusted under 35 U.S.C. 154(b) by 171 days.

(21) Appl. No.: 11/352,072

(22) Filed: Feb. 10, 2006

(65) Prior Publication Data

US 2007/0188377 A1    Aug. 16, 2007

(51) Int. Cl.
*G01S 13/52* (2006.01)
(52) U.S. Cl. ............... 342/160; 342/162; 342/126
(58) Field of Classification Search ........ 342/159–162, 342/126, 128–132
See application file for complete search history.

(56) References Cited

U.S. PATENT DOCUMENTS

| | | | | |
|---|---|---|---|---|
| 4,298,873 A * | 11/1981 | Roberts | ................. | 342/375 |
| 4,612,549 A * | 9/1986 | Geyer et al. | ................. | 342/379 |
| 4,978,961 A * | 12/1990 | Williams et al. | ......... | 342/25 C |
| 5,736,956 A * | 4/1998 | Kennedy et al. | ............. | 342/90 |
| 5,831,570 A * | 11/1998 | Ammar et al. | ........... | 342/26 B |
| 6,591,171 B1 * | 7/2003 | Ammar et al. | ............... | 701/16 |
| 6,608,584 B1 * | 8/2003 | Faulkner | ................. | 342/25 R |
| 7,038,618 B2 * | 5/2006 | Budic | ....................... | 342/195 |
| 7,136,012 B2 * | 11/2006 | Wasiewicz | ................. | 342/33 |
| 7,250,902 B2 * | 7/2007 | Manoogian et al. | ........ | 342/154 |
| 2007/0188377 A1 * | 8/2007 | Krikorian et al. | ........... | 342/160 |

FOREIGN PATENT DOCUMENTS

EP       650070 A2 *   4/1995

\* cited by examiner

*Primary Examiner*—John B Sotomayor
(74) *Attorney, Agent, or Firm*—Leonard A. Alkov

(57) ABSTRACT

A radar transmitter is at a first location on a moving platform and illuminates a target with a sequence of frequency modulated radar pulses. The frequency modulated pulses are linear frequency modulated, i.e. chirped. The target reflects the frequency modulated radar pulses. A receiving antenna has a difference pattern null and receives the reflections from the target as a main scatterer and an ambiguity of the main scatterer. The sequence of pulses change the start of their frequency modulation (chirp) over a SAR array. The change in start frequency from pulse to pulse allows to shift the range ambiguity so as to align with the delay/Doppler difference pattern null of the antenna. Thus, both the main scatterer as well as the shifted range ambiguity are on the difference pattern null, facilitating their cancellation.

12 Claims, 6 Drawing Sheets

WAVEFORM AMBIGUITY OPTIMIZATION FOR BISTATIC RADAR OPERATION

BACKGROUND OF THE INVENTION

1. Field of Invention

This invention is in the field of bistatic radars using space time adaptive processing where transmit pulse coding minimizes the effect of Range/Doppler ambiguities.

2. Description of the Related Art

Space Time Adaptive Processing (STAP) is generally used in Air Moving Target Indicators (AMTI) and Ground Moving Target indicators (GMTI) radar applications to cancel the stationary ground clutter and/or strong scatterers thus increasing probability of detection of moving targets. In a AMTI/GMTI monostatic radar, a map is created of a frequency change (Doppler) and range from the radar returns. The co-location of receiver and transmitter in a monostatic radar facilitates the collection of pulse Doppler data and creation of constant range and constant Doppler contours as only the motion of one receiving/transmitting platform needs to be accounted for.

Conversely, in a bistatic radar there is a separation between the transmitter portion (illuminator) and the receiver. The receiver and transmitter are on their own respective platforms having separate, un-correlated motions. I spite of these separate motions, GMTI and AMTI are computed from accurate phase information to facilitate deriving a phase coherent image at the receiver. Thus, a challenge in the design and operation of bistatic radars is to maintain phase coherency between the transmitter (illuminator) and the receiver, especially when used as GMTI and AMTI for moving targets against stationary clutter and a strong scatterer (or jammer).

Further, a bistatic radar, because of the spacial separation between the transmitter (illuminator) and the receiver, is faced with the problem of range/Doppler ambiguity. Although the receiver and transmitter have separate motion components, accurate return phase and timing information needs to be preserved to re-constitute a phase coherent, range accurate image at the receiver. Similarly, the ambiguity problem also increases in the Doppler plane further posing a challenge to AMTI and, GMTI operation.

SUMMARY OF THE INVENTION

Above limitations are avoided by a bistatic radar of the present invention comprising a radar transmitter is at a first location on a moving platform having a first motion. The radar transmitter illuminates a target with a sequence of pulses. A first frequency modulated radar pulse and a second frequency modulated radar pulse, part of the sequence of pulses, are transmitted at a pulse repetition frequency (PRF). The frequency modulated pulses are linear frequency modulated (LFM), i.e. chirped. The target reflects the first frequency modulated radar pulse and the second frequency modulated radar pulse to a receiving antenna having a second motion. The receiving antenna has a difference pattern null.

The receiving antenna receives the first frequency modulated radar pulse and the second frequency modulated radar pulse, reflected from the target, to image the target as a main scatterer and an ambiguity of the main scatterer.

The first frequency modulated radar pulse modulated starts its frequency modulation (chirp) at a first frequency. The second frequency modulated radar pulse modulated starts its frequency modulation at a second frequency. A subsequent pulse starts at yet another frequency. The pulse to pulse change in frequency allows to shift the range ambiguity from the main scatterer so as to align with the difference pattern null of the receiving antenna thus positioning both the main scatterer as well as the shifted range ambiguity on the difference pattern null, facilitating their cancellation. The first pulse frequency start and the second pulse frequency start, as well as the other frequency start for pulses forming an array are chosen to align the main scatterer and the ambiguity of the main scatterer along the difference pattern null of the radar receiving antenna.

DETAILED DESCRIPTION OF THE INVENTION

The present invention describes a method for a bistatic radar operation wherein a slow frequency change is applied to the starting point of each pulse, changing from pulse to pulse, thereby reducing the effect of ambiguities and facilitating the alignment of main scatterers and range ambiguities with the difference pattern null.

A bistatic radar maintains overall bistatic system synchronization by maintaining receiver window control over both the direct path (i.e. illuminator to receiver range) and the indirect path (i.e. illuminator to ground to receiver containing the target information) so that autonomous bistatic operation is possible and interference from ambiguities is minimized.

Figure 1:
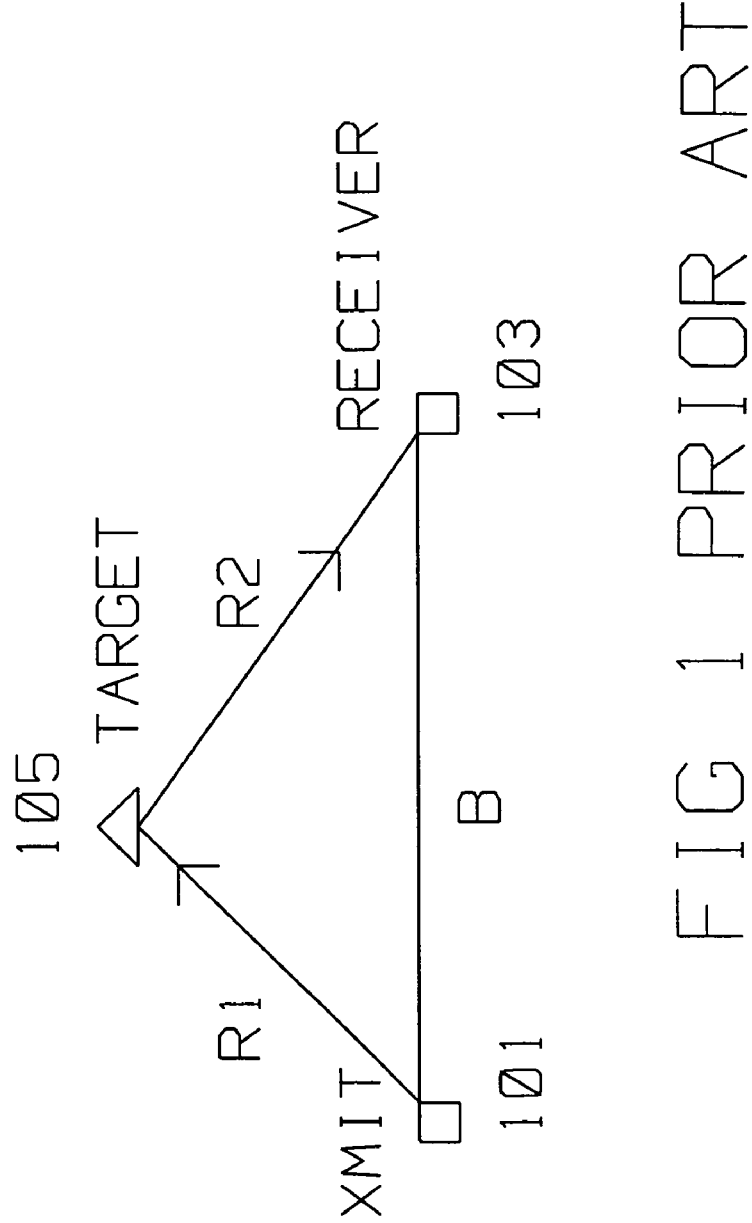
FIG. 1 is a bistatic radar operational geometry.

FIG. 1 shows the operation of a bistatic radar of this teaching. Transmitter (or illuminator) 101 transmits a radar signal, typically a series of radar pulses, to illuminate target 105. Target 105 is at a distance RI away from transmitter 101.

Target 105 reflects the radar energy contained in the radar pulses towards receiver 103. Receiver 103 is a distance R 2 away from target 105. Receiver 103 is also a distance B away from transmitter 101.

Distances R1, R2 and B are measured from a central reference point (CRP), typically the point where the receive or transmit antenna receive or launch the radar pulse wavefront.

Radar receiver (103) receives the transmitter encoded radar signal reflected from target 105 along the indirect path on a first channel, and also has a second channel for receiving the encoded radar signal from radar transmitter (101) along the direct path.

Radar receiver (103) decodes the encoded radar signal arriving from reflections off the target, using the indirect path to compute an image of the target.

Figure 2:
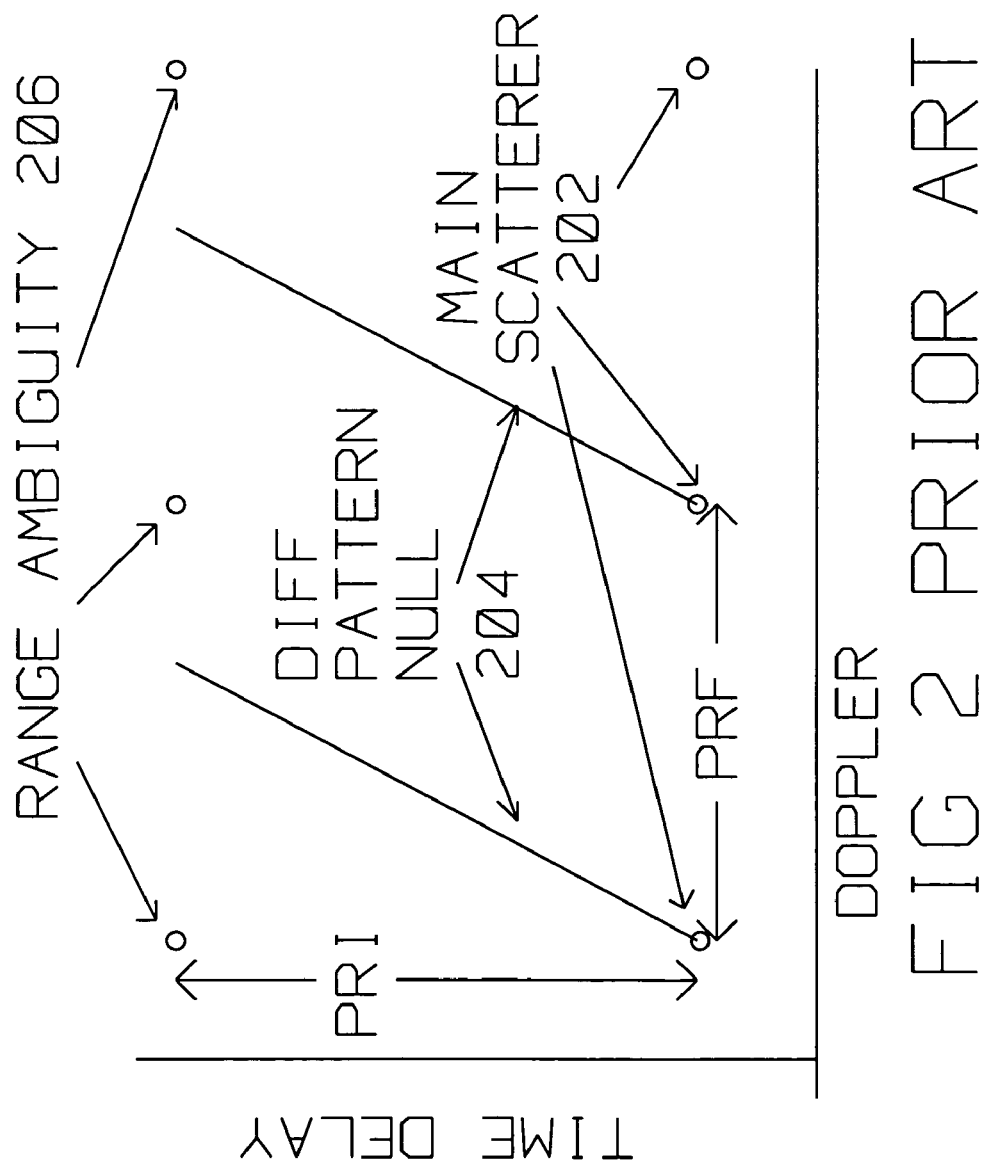
FIG. 2 is a prior art waveform used with bistatic radars where the range ambiguities and main scatterers are typically not aligned with the difference pattern null

FIG. 2 shows the use of frequency modulated pulses of the prior art in a Time Delay/Doppler plot. Radar pulses are transmitted a at a Pulse Repetition Frequency (PRF). Main scatterer 202 induces range ambiguity 206 at a pulse repetition interval (PRI). The difference null pattern 204 is aligned with main scatterer 202 but cannot be made to align with range ambiguity 206.

Figure 3A:
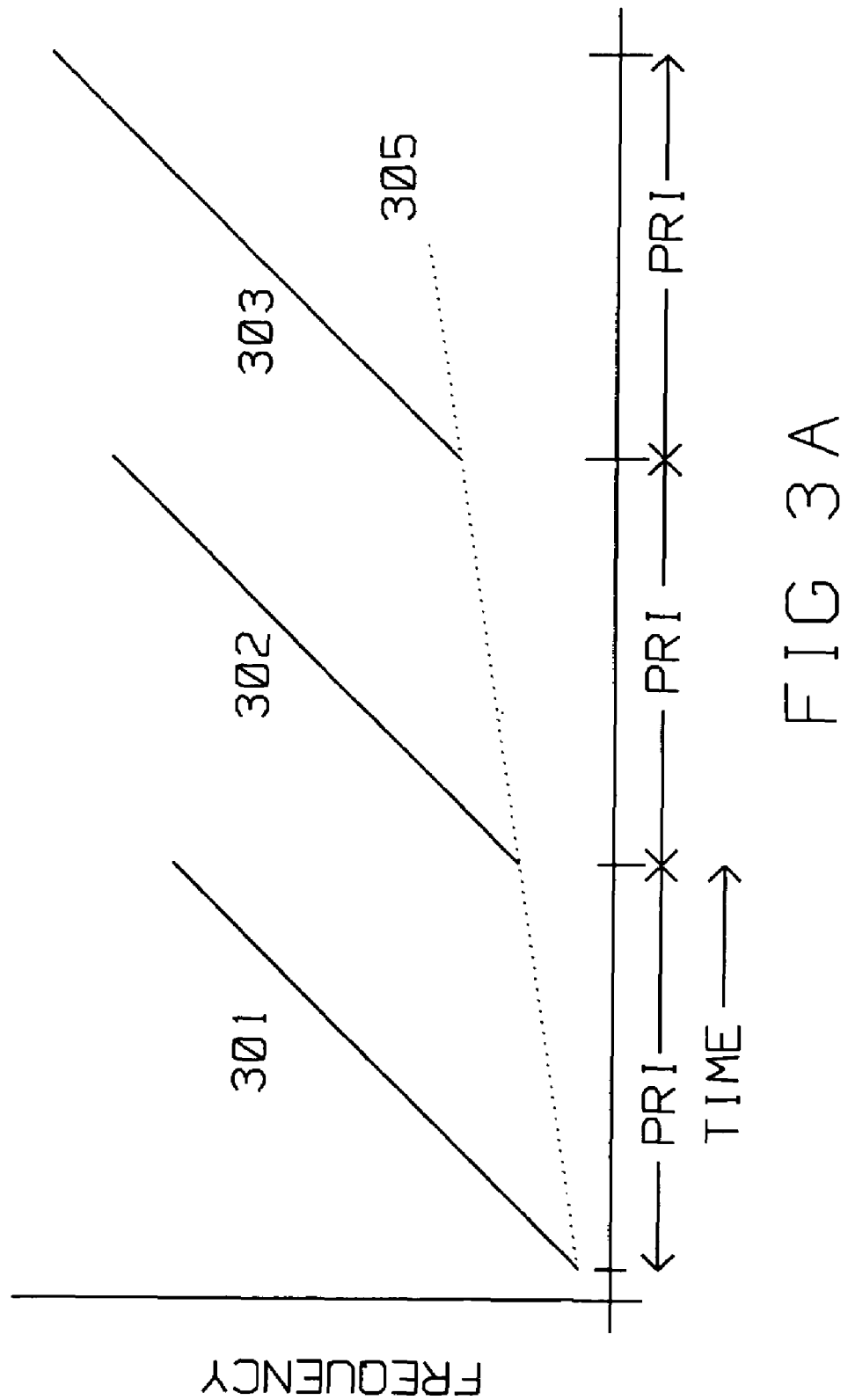
FIG. 3A is a transmitted pulse train emitted by the transmitter of the present disclosure where each subsequent frequency modulated pulse starts at a higher frequency.
Figure 3B:
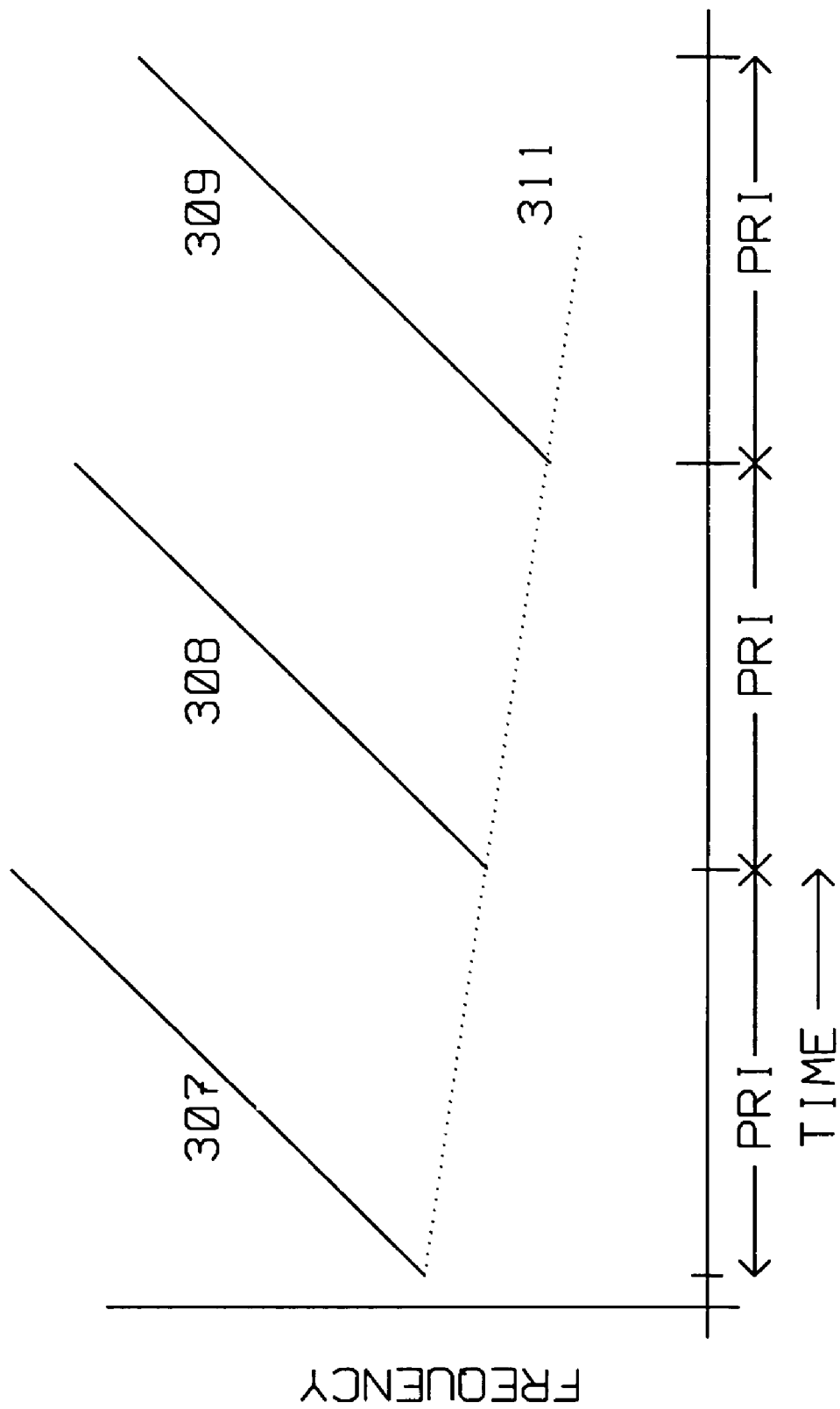
FIG. 3B is a transmitted pulse train emitted by the transmitter of the present disclosure where each subsequent frequency modulated pulse starts at a lower frequency.

In contrast, FIG. 3A and FIG. 3B shows the use of frequency modulated pulses of the present teaching. In one embodiment, FIG. 3A, each frequency modulated pulse is initiated at a higher (different) frequency as compared to the previous pulse. As shown in FIG. 3A, the chirp of transmit pulse 302, that is, its frequency modulation, starts at a frequency higher than transmit pulse 301. Similarly, the start frequency of transmit pulse 303 is higher than that of transmit pulse 302. This pulse to pulse frequency shift is given by $$\frac{\dot{f}}{PRF}$$

where $\dot{f}$ is the derivative (or slope) of a linear frequency modulated (chirped) radar pulse;

PRF is the pulse repetition frequency.

The slope of frequency change from pulse to pulse is shown by line 305.

Similarly, in FIG. 3B, pulse 307 starts at a higher frequency than pulse 308 and pulse 309. The slope of decreasing starting frequencies is indicated by line 311 and applies to all pulses within a SAR type array.

Thus, a radar transmitter is at a first location on a moving platform having a first motion. The radar transmitter illuminates a target with a first frequency modulated radar pulse and a second frequency modulated radar pulse, where the first frequency modulated radar pulse and a second frequency modulated radar pulse are transmitted at a pulse repetition frequency (PRF). The frequency modulated pulses are linear frequency modulated, i.e. chirped. The target reflects the first frequency modulated radar pulse and the second frequency modulated radar pulse to a receiving antenna having a second motion. The receiving antenna has a difference pattern null.

The receiving antenna receives the first frequency modulated radar pulse and the second frequency modulated radar pulse, reflected from said target to image the target as a main scatterer and an ambiguity of the main scatterer.

The first frequency modulated radar pulse modulated starts its frequency modulation (chirp) at a first frequency. The second frequency modulated radar pulse modulated starts its frequency modulation at a second frequency. A subsequent pulse starts at yet another frequency aligned with line 305, or line 311.

Figure 4:
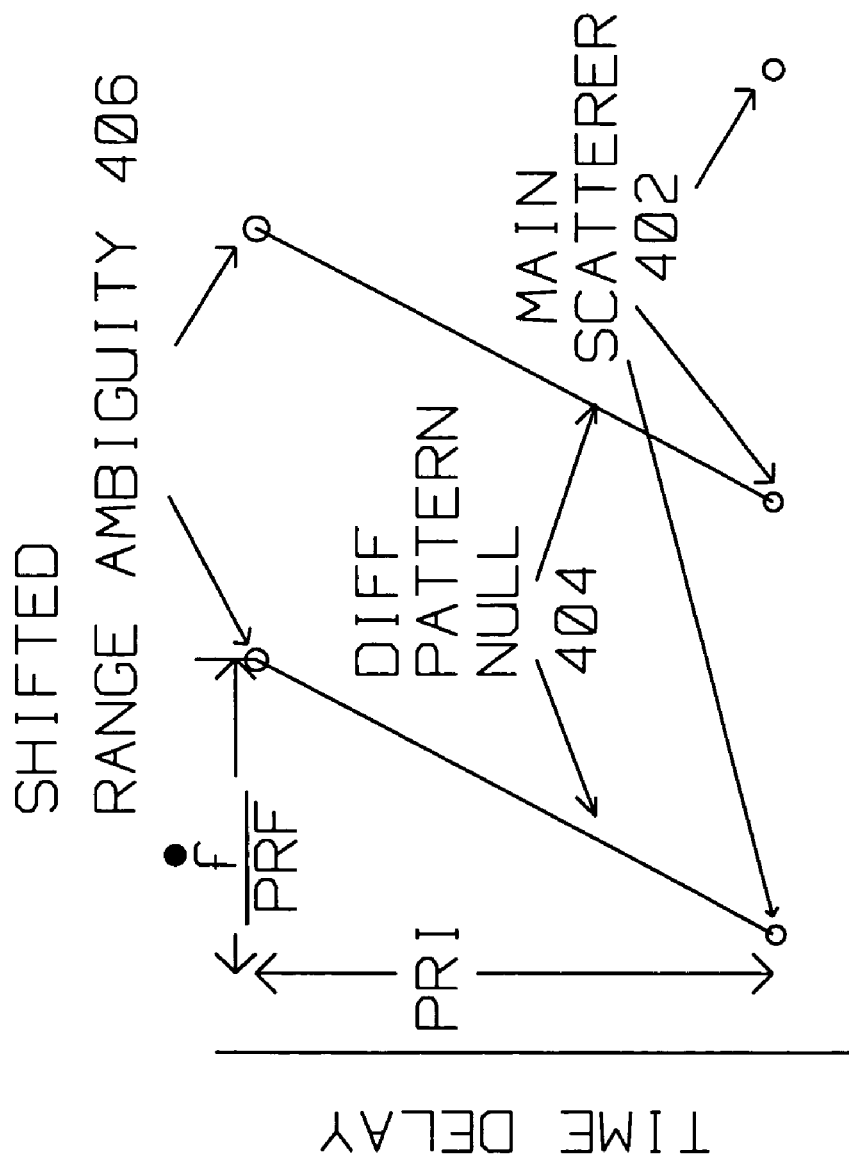
FIG. 4 shows how using the encoded waveform of the present disclosure has shifted the range ambiguity and main scatterer so as to align along the difference pattern null because of the frequency change applied to a radar pulse train as shown in FIG. 3A and/or 3B.

As shown in FIG. 4, the pulse to pulse change in starting frequency along line 305 (or 311) allows to shift range ambiguity 406 so as to align with the difference pattern null 404, thus positioning both the main scatterer 402 as well as the shifted range ambiguity 406 on the difference pattern null, facilitating their cancellation. Specifically, the first frequency start and the second frequency start are chosen to align the main scatterer and the ambiguity of the main scatterer along the difference pattern null of the radar receiving antenna.

Figure 5:
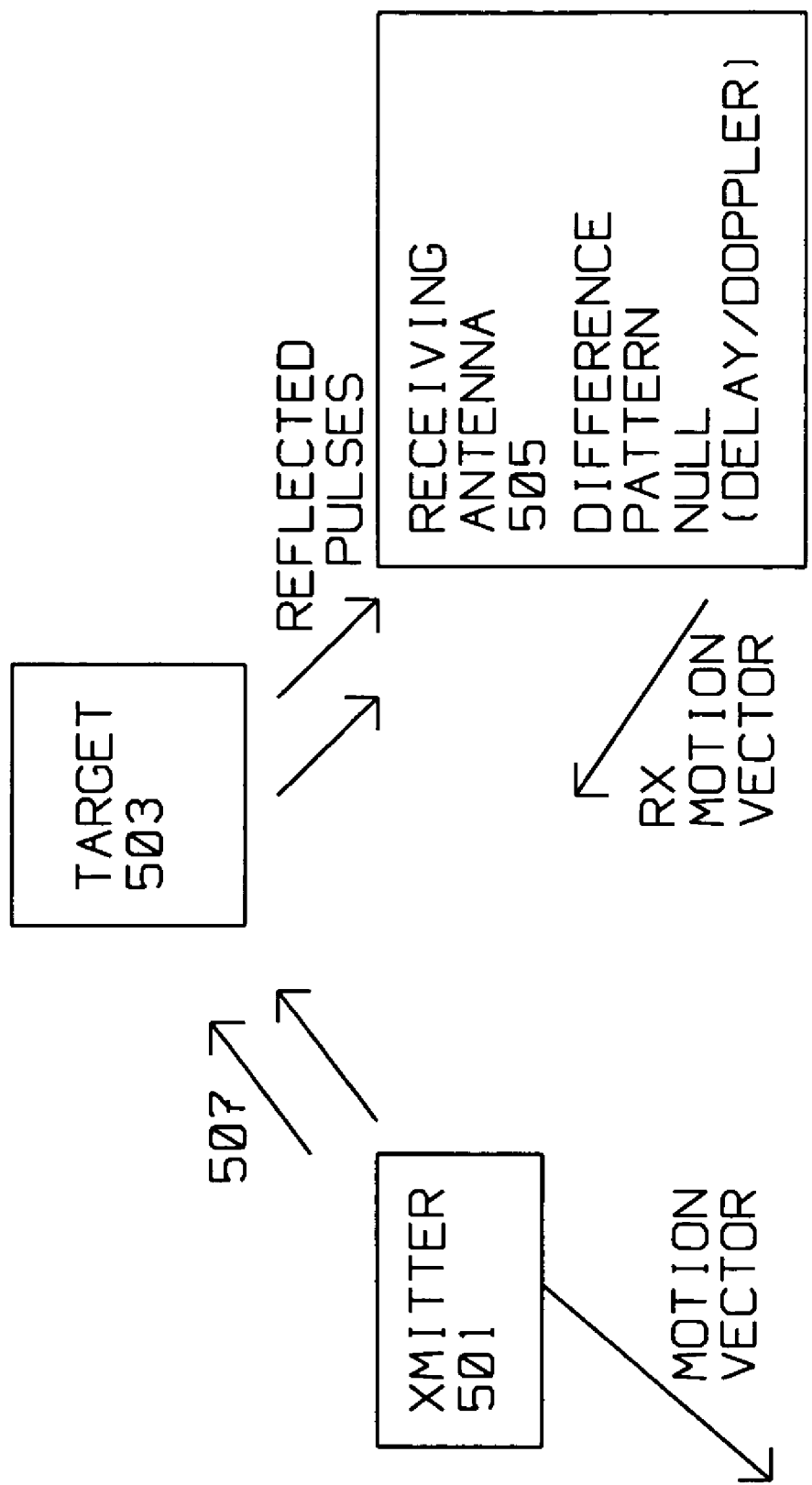
FIG. 5 is a receiver of the bistatic radar of the present teaching.

FIG. 5 shows radar transmitter 501 at a first location on a moving platform moving along its motion vector, and illuminating a target 503 with a sequence of frequency modulated radar pulses 507. The frequency modulated pulses are linear frequency modulated, i.e. chirped. Target 503 reflects the frequency modulated radar pulses as reflected pulses. A receiving antenna 505 has a difference pattern null and receives the reflections from the target as a main scatterer and an ambiguity of the main scatterer. Receiving antenna moves along the RX motion vector. The sequence of pulses change the start of their frequency modulation (chirp) over a SAR array in accordance with FIGS. 3 and 4. The change in start frequency of the pulses allows to shift the range ambiguity so as to align with the difference pattern null of the antenna (in the Delay/Doppler plane) as shown in FIG. 4. This twists the main lobe of the ambiguity function in the time delay/Doppler (frequency) plane. Thus, both the main scatterer as well as the shifted range ambiguity are on the difference pattern null, facilitating their cancellation.

This concept can further extended by having multiple airborne transmitters compensate the transmit (illuminating) pulses for their own motion. Thus the reflections from the target look as if the illuminator is stationary.

Adaptive beam shape control on transmit and receive is used to reduce the impact of critical waveform ambiguities, improve clutter rejection and target location accuracy.

All references cited in this document are incorporated herein in their entirety by reference. Specifically, *Synthetic Aperture Radar* by John J Kovaly, ISBN 0-89006-056-8, Artech House, and *Radar Technology* by Eli Brookner, ISBN 0 89006 0215, Artech House, are incorporated herein in their entirety by reference to provide a background for this invention and definition of variables used herein.

Although presented in exemplary fashion employing specific embodiments, the disclosed structures are not intended to be so limited. For example, while a direct antenna and an indirect antenna are described for receiver 103, in another, simplified embodiment, the same concept applies in the case where a single antenna is used for both functions.

Those skilled in the art will also appreciate that numerous changes and modifications could be made to the embodiment described herein without departing in any way from the invention.

We claim:

1. A bistatic radar system comprising:

a radar transmitter at a first location on a moving platform having a first motion, said radar transmitter illuminating a target with a first frequency modulated radar pulse and a second frequency modulated radar pulse, said first frequency modulated radar pulse and a second frequency modulated radar pulse transmitted at a pulse repetition frequency, said target reflecting said first frequency modulated radar pulse and said second frequency modulated radar pulse to a receiving antenna having a second motion, said receiving antenna having a difference pattern null;

said receiving antenna receiving said first frequency modulated radar pulse and said second frequency modulated radar pulse, reflected from said target to image said target as a main scatterer and an ambiguity of said main scatterer;

said first frequency modulated radar pulse modulated starting at a first frequency;

said second frequency modulated radar pulse modulated starting at a second frequency;

said first frequency and said second frequency chosen to align said main scatterer and said ambiguity of said main scatterer along said difference pattern null of said receiving antenna.

2. A bistatic radar system as described in claim 1, wherein said first frequency is higher than said second frequency.

3. A bistatic radar system as described in claim 1 wherein said first frequency is lower than said second frequency.

4. A bistatic radar system as described in claim 3 wherein a frequency difference between said first frequency and said second frequency is inversely proportional to said pulse repetition frequency.

5. A bistatic radar system as described in claim 4 wherein said frequency difference is proportional to the difference in velocity between said first motion and said second motion.

6. A bistatic radar system as described in claim 4 wherein said frequency difference is less than 5 percent of said first frequency.

7. A method for operating a bistatic radar system comprising the steps of:

illuminating a target with a first frequency modulated radar pulse and a second frequency modulated radar pulse from a radar platform having a first motion, said first frequency modulated radar pulse and a second frequency modulated radar pulse transmitted at a pulse repetition frequency, said target reflecting said first frequency modulated radar pulse and said second frequency modulated radar pulse;

receiving the reflection of said first frequency modulated radar pulse and said second frequency modulated radar pulse from said target; using a receiving antenna having a difference pattern null and a second motion;

imaging said target by receiving said first frequency modulated radar pulse and said second frequency modulated radar pulse reflected from said target as a main scatterer and an ambiguity of said main scatterer;

starting frequency modulation of said first frequency modulated radar pulse at a first frequency;

starting frequency modulation of said second frequency modulated radar pulse at a second frequency;

said first frequency and said second frequency chosen to align said main scatterer and said ambiguity of said main scatterer along said difference pattern null of said receiving antenna.

8. A method as described in claim 7, wherein said first frequency is higher than said second frequency.

9. A method as described in claim 7 wherein said first frequency is lower than said second frequency.

10. A method as described in claim 8 wherein a frequency difference between said first frequency and said second frequency is inversely proportional to said pulse repetition frequency.

11. A method as described in claim 8 wherein said frequency difference is proportional to the difference in velocity between said first motion and said second motion.

12. A method as described in claim 8 wherein said frequency difference is less than 5 percent of said first frequency.

\* \* \* \* \*